Figure 1:
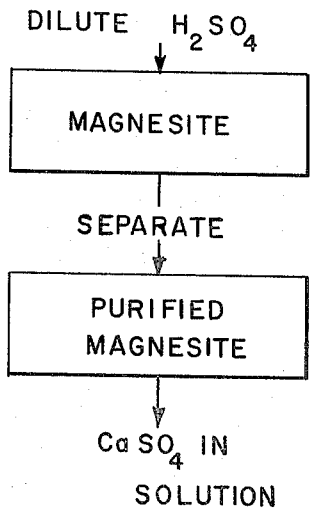

Feb. 21, 1967  R. P. HEUER  3,305,302
PROCESS OF BENEFICIATING MAGNESITE
Filed Oct. 2, 1963  3 Sheets-Sheet 1

INVENTOR
Russell Pearce Heuer
BY
ATTORNEYS

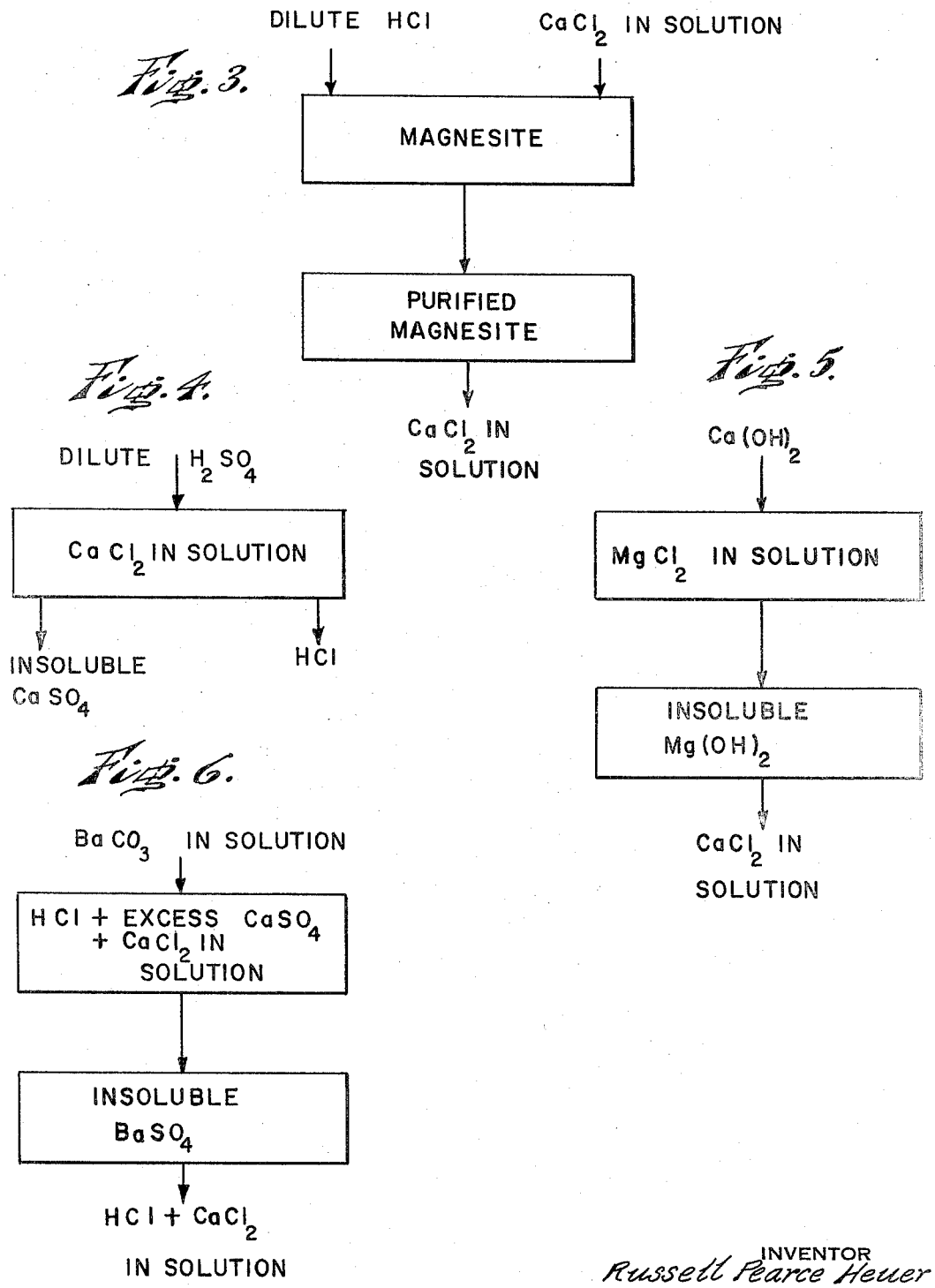

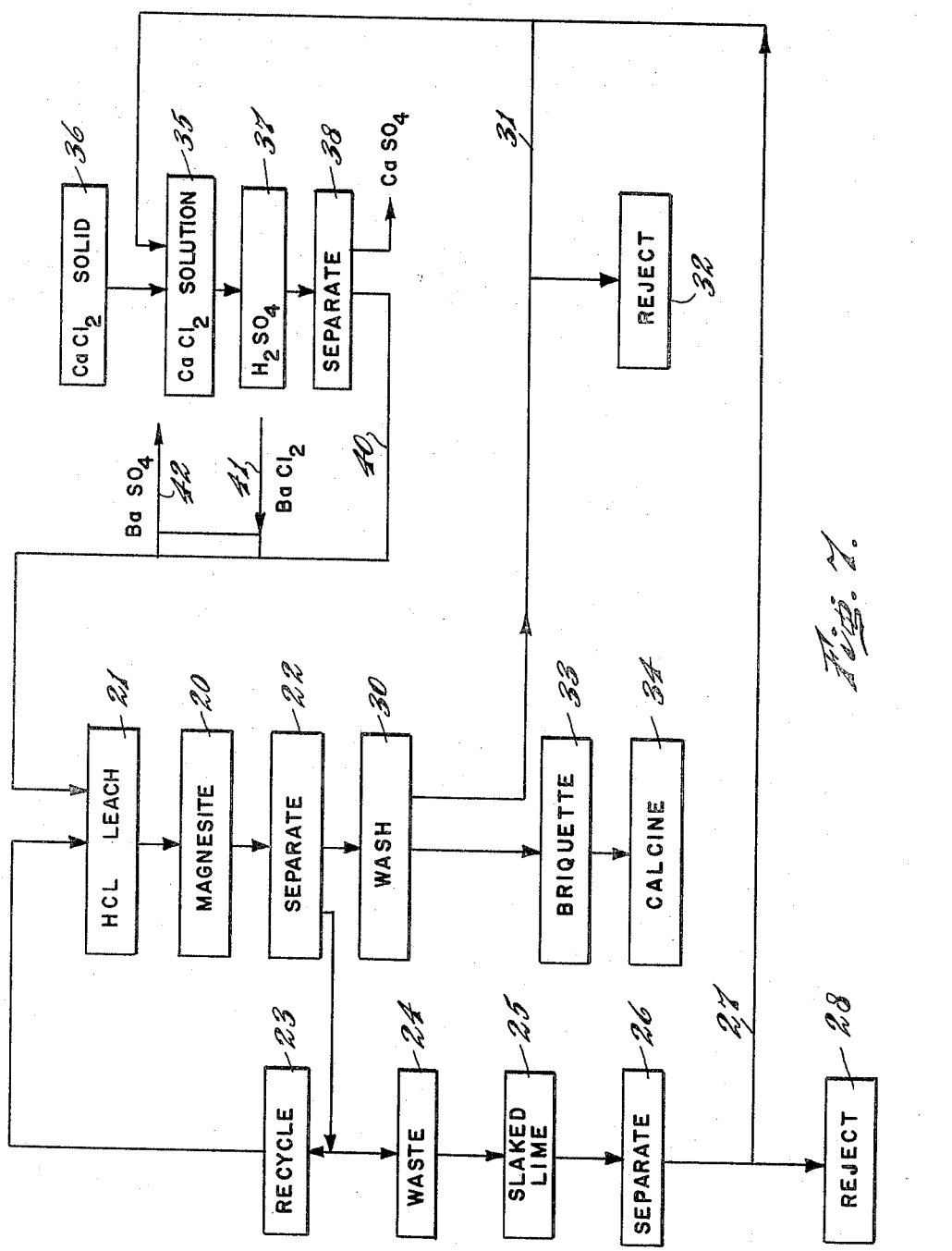

United States Patent Office 3,305,302
Patented Feb. 21, 1967

3,305,302
PROCESS OF BENEFICIATING MAGNESITE
Russell Pearce Heuer, Villanova, Pa., assignor to General Refractories Company, a corporation of Pennsylvania
Filed Oct. 2, 1963, Ser. No. 313,200
4 Claims. (Cl. 23—67)

The present invention relates to beneficiation of naturally occurring magnesite ($MgCO_3$) which contains calcium carbonate in the form of calcite, aragonite, dolomite or otherwise as an impurity. The invention is primarily concerned with producing by beneficiation a refractory grade of magnesite from natural magnesite deposits.

A purpose of the invention is to prepare a calcined magnesite suitable for refractory purposes containing less than 1% of lime from lower grade magnesite containing substantial quantities of lime as an impurity.

A further purpose is to beneficiate natural magnesite containing substantial quantities of lime by treatment with a solution of hydrochloric acid to dissolve calcium compounds preferentially to magnesium compounds and reduce the amount of lime in the magnesite treated to less than 0.5%.

A further purpose is to beneficiate natural magnesia containing 10% of lime or more first by using physical methods, such as heavy medium separation or froth flotation or a combination of both methods, and then further beneficiating by a chemical method using a dilute acid such as sulfuric acid or hydrochloric acid or a combination of the two in sequence, to dissolve the remaining lime so that the beneficiated magnesite contains less than 0.5% lime.

A further purpose is to treat magnesite containing lime as an impurity first with dilute sulfuric acid to form a solution of calcium sulfate, to separate the purified magnesite from the calcium sulfate, and then to treat the purified magnesite with dilute hydrochloric acid to form a solution of calcium chloride and then to separate the further purified magnesite from the solution of calcium chloride. The hydrochloric acid treatment may precede or follow the treatment with sulfuric acid.

A further purpose is to regenerate a solution produced by leaching lime from magnesite with dilute hydrochloric acid by treating the resulting solution containing calcium chloride with dilute sulfuric acid, thereby forming a solution of hydrochloric acid and precipitating calcium sulfate, to separate the calcium sulfate precipitate from the regenerated hydrochloric acid resulting, and then to use this regenerated hydrochloric acid to beneficiate additional amounts of magnesite.

A further purpose is to remove magnesium chloride from the solution used to leach magnesite by precipitating it by means of calcium hydroxide.

A further purpose is to remove excess calcium sulfate from the solution used to leach magnesite by precipitaing it by means of a water soluble barium salt.

Further purposes appear in the specification and in the claims.

The drawings are flow charts useful in explaining the invention.

The preparation of calcined magnesite from naturally occurring magnesite has been practiced commercially for many years in connection with the production of a raw material for making magnesite refractory brick. In order to make a high grade magnesite refractory brick it is necessary that the calcine be so low in impurities that the magnesia content exceeds 90%. The amount of available pure natural magnesite is limited and techniques have been developed to utilize lower grade magnesite by beneficiation. Among other procedures, impurities, principally lime and/or silica, have been reduced by heavy medium separation or froth flotation or a combination of these procedures.

A beneficiated magnesite of the character under discussion is being produced in the Province of Salzburg, Austria having the following typical analysis by weight:

| | Percent |
|---|---|
| LOI | 50.90 |
| $SiO_2$ | 0.12 |
| $Fe_2O_3$ | 2.60 |
| $Al_2O_3$ | 0.03 |
| CaO | 1.20 |
| MgO (diff) | 45.05 |

The beneficiated magnesite on a calcined basis assays as follows:

| | Percent |
|---|---|
| CaO | 2.45 |
| $SiO_2$ | 0.24 |

MgO by difference in excess of 92%.

Notwithstanding the fact that this beneficiated mineral is high in magnesia, it is deficient in refractory properties because it contains lime above that combined with the silical as dicalcium silicate, $2CaO.SiO_2$. This excess lime in the presence of iron oxide which is also available forms dicalcium ferrite, $2CaO.Fe_2O_3$, and brownmillerite, $4CaO.2Al_2O_3.2Fe_2O_3$, in a total amount exceeding 5%. Unfortunately these compounds are not refractory and therefore detract from the usefulness of the beneficiated magnesite. It is therefore very important to further treat the beneficiated magnesite to further reduce its lime content. This need exists not only in the case of a beneficiated magnesite of this character but also in order to obtain high quality magnesite from other low grade magnesite minerals, including low grade magnesites generally, dolomitic magnesites and dolomites.

I have discovered that certain of the dilute common acids will preferentially react on and remove calcium from magnesite or other minerals high in magnesium carbonate notwithstanding that there is much more magnesium carbonate than calcium carbonate present. In other words, these dilute acids under the conditions of use preferentially remove calcium rather than magnesium even though there is much less calcium present.

In one technique according to the invention the magnesite which has been physically beneficiated, as described above, is treated with dilute sulfuric acid. I prefer to use a solution containing 110% of the theoretical amount of sulfuric acid required to convert lime to calcium sulfate. That is, for each part of lime (CaO) I use about 1.93 parts by weight of sulfuric acid in the preferred embodiment. Thus in a magnesite containing 1.2% of lime the sulfuric acid required is 2.32 parts by weight per 100 parts of magnesite. This sulfuric acid is preferably dissolved in a volume of water equal to about 10 times the weight of the magnesite. Accordingly, the acid preferably contains 0.232% of sulfuric acid.

The concentration of sulfuric acid may vary between 0.05% and 0.25%.

The exposure of the magnesite described above to ten times its weight of a solution containing 0.23% of sulfuric acid caused a substantial quantity of calcium oxide present to enter the solution. After filtration it was found that the purified magnesite contained only one-third of its original content of lime.

Accordingly it is evident that by a simple leaching operation with dilute sulfuric acid the lime is preferentially leached out while the magnesium carbonate remains, and the consumption of acid is very small indeed.

It is necessary to have a large quantity of water because the calcium sulfate which is formed is not readily soluble in water. At room temperature less than about 0.2 part of calcium sulfate dissolve in 100 parts of water by weight.

The solution therefore removes 0.80% of lime from the magnesite, thus requires ten tons of water for every ton of magnesite treated.

If there is such a large supply of water available and if disposal of the waste water presents no problem, it is possible to practice this process economically. However, in many locations this is not possible. It will be possible in some cases to utilize acidified impure water or even seawater for leaching processes.

In cases where adequate supplies of water and adequate waste disposal facilities are not available, I find that magnesite can be beneficiated effectively by using dilute hydrochloric acid. In other words, hydrochloric acid will react preferentially on calcium carbonate even in the presence of a vastly greater amount of magnesium carbonate, and will preferentially extract lime, producing calcium chloride which is very readily soluble in water, since 60 parts by weight or more will dissolve in 100 parts of water at room temperature.

In the case of hydrochloric acid it is best to use a dilute solution containing about 5% of hydrochloric acid in water. Good results are obtained using concentrations of hydrochloric acid in water in the range between 1 and 10% by weight.

In the preferred embodiment I use a solution of 5% hydrochloric acid, I continue the leaching for about thirty minutes or more at room temperature and then separate the magnesite from the solution. I find that using beneficiated magnesite of the analysis above set forth, the residual lime content after treatment with the dilute hydrochloric acid is 0.40% or less while the solution contains the equivalent of 0.80% of lime dissolved from the magnesite in the form of calcium chloride. Thus two-thirds of the lime impurity has been extracted and only a very small amount of magnesium carbonate is dissolved. The preferential extraction of calcium carbonate is so great that the loss of magnesium carbonate is at a minimum and therefore hydrochloric acid is not wasted.

In the practical procedure according to the invention, the physically beneficiated magnesite is leached with a solution of 5% of hydrochloric acid in water and the action is continued for a reasonable time until the pH of the solution approaches 7. Then the magnesite is separated from the solution as by filtering and is then washed and then dried in a centrifuge. The treated magnesite is then desirably briquetted and calcined at temperatures exceeding 1500° C. in suitable kilns to produce refractory magnesia.

In some cases it may be proper to simply discard the filtrate containing calcium chloride. Waste disposal may be a problem, however, and also there may be chloride values which should be recovered. The filtrate may be reused by adding hydrohloric acid to establish the proper concentration, for example 5%, and then the restored dilute hydrochloric acid may be used to treat more magnesite in the same way that the original dilute hydrochloric acid was used. This process of restoring the acid and using it to treat more magnesite can be repeated over and over again until the calcium chloride in the filtrate builds up to a concentration of 10% or more, after which the solution should not be further used for leaching magnesite.

It still may not be desirable to reject the calcium chloride solution either because it may have chemical values or because it may create a waste disposal problem. The solution containing calcium chloride may be regenerated by treating it with sulfuric acid to liberate hydrochloric acid in the solution and precipitate calcium sulfate. The calcium sulfate is separated, suitably by filtration, and the regenerated dilute hydrochloric acid can then be used for leaching more magnesite. In determining the quantity of sulfuric acid to add, it may be desirable to add insufficient sulfuric acid to convert all calcium chloride to calcium sulfate, leaving about 1% unconverted calcium chloride in the regenerated hydrochloric acid solution.

Eventually this regenerated hydrochloric acid solution will contain substantial quantities of magnesium chloride and the quantity of magnesium chloride will rise each time the regeneration is repeated. The magnesium chloride can be precipitated from the filtrate containing magnesium chloride by treating the filtrate with calcium hydroxide, suitably slaked lime or slaked dolomite. The magnesium chloride will form a precipitate of magnesium hydroxide and calcium chloride will go into solution. The magnesium hydroxide precipitate can be separated suitably by filtration and the calcium chloride solution which is free of magnesium salt can then be regenerated by treating it with sulfuric acid as above described.

In some cases the restored solution of dilute hydrochloric acid will contain an excess of calcium sulfate, for example 0.5 to 1% by weight. If this solution is used to leach magnesite, the leach liquor formed has a higher pH value that the original dilute hydrochloric acid solution and the solubility of calcium sulfate may be reduced to as little as 0.1%. This may precipitate calcium sulfate which would contaminate the magnesite. Where this difficulty arises, it can be avoided by treating the regenerated solution containing excess calcium sulfate with a soluble barium salt such as barium chloride. Barium chloride can be generated in situ by treating witherite, $BaCO_3$, with dilute hydrochloric acid solution, thus producing barium chloride which will react with the calcium sulfate in solution and precipitate insoluble barium sulfate which can be separated as by filtration. It is important to avoid any excess of barium over that required to form barium sulfate.

The beneficiated magnesite after purifying as described above, will contain approximately 0.8 percent of lime and 0.24 percent of silica. The amount of excess lime above that is required to form dicalcium silicate, $2CaO.SiO_2$, is then only 0.36 percent which is capable of forming less than 1 percent of dicalcium ferrite and/or brownmillerite. Thus these undesirable fluxing materials have been reduced by more than 80 percent of the content originally present, greatly improving the quality of the calcined magnesite when used for making refractory brick.

*Example I*

In this example, as charted in FIGURE 1, one ton of physically beneficiated magnesite as referred to above is treated with ten tons of dilute sulfuric acid containing 0.232 percent of sulfuric acid at room temperature in a leaching tank. The treatment is continued until the lime is reduced from 1.20 percent to 0.40 percent, the balance being dissolved in the water as calcium sulfate.

The beneficiated magnesite is then filtered, washed, dried and calcined at a temperature in excess of 1500° C. in a suitable kiln.

*Example II*

Figure 2:
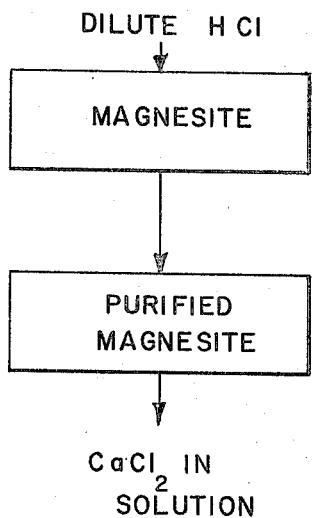

In this example charted in FIGURE 2, one ton of the physically beneficiated magnesite described above is leached with 0.36 ton of 5 percent hydrochloric acid in water. The reaction is carried on for one hour in a leaching tank and the lime content of the magnesite is reduced from 1.20 to 0.40 percent, the balance dissolving in the water as calcium chloride. The magnesite is filtered and washed and then calcined in a kiln at 1500° C.

*Example III*

The filtrate from Example II contains calcium chloride. This filtrate is restored as shown in FIGURE 3 by building up its concentration of hydrochloric acid to 5 percent and it is then used to leach additional magnesite according to Example II. This procedure continues until the content of calcium chloride in the filtrate is 10 percent or more.

Example IV

In this example charted in FIGURE 4, the filtrate contains calcium chloride at a high enough concentration so that is can no longer be effectively used without regeneration. One ton of this filtrate containing 10% of calcium chloride is treated with sufficient sulfuric acid to convert all but about 1% of the calcium chloride to calcium sulfate. The solution is allowed to settle and then the precipitate of calcium sulfate is separated by filtration and dilute hydrochloric acid is obtained. This can be used to leach additional magnesite.

Example V

After repeated use, the leaching solution of Example IV begins to contain substantial quantities of magnesium chloride. The procedure for removing magnesium chloride is charted in FIGURE 5. One ton of filtrate from Example IV containing 5% of magnesium chloride is treated with 0.1 ton of solid calcium hydroxide. A precipitate of magnesium hydroxide forms after settling and this is separated by filtration. The filtrate contains calcium chloride in solution and can be used directly for leaching more magnesite by adding hydrochloric acid or can be put through the process of Example IV to produce hydrochloric acid and then used for further leaching of magnesite.

Example VI

As charted in FIGURE 6, one ton of solution containing 5% hydrochloric acid, 1% of calcium sulfate and 5% of calcium chloride is treated with a corresponding amount of barium carbonate so that barium chloride will be liberated in a quantity not in excess of that which will react with the sulfate present. Barium sulfate precipitates on standing and is removed by filtration. The filtrate can be used to leach more magnesite after restoring the acid concentration.

Example VII

Example VII is a recycling procedure for beneficiation of magnesite and involves the preferred embodiment of the invention.

FIGURE 7 illustrates a flow sheet for a beneficiating plant for treating previously physically beneficiated magnesite of the composition referred to above. It is computed on a basis of 100 tons of magnesite. Magnesite in suitable finely divided form, for example through a screen of Tyler standard 100 mesh per linear inch in treating tank 20 is treated with 200 to 300 tons of a solution containing hydrochloric acid supplied from storage tank 21. The slurry of magnesite and solution is drawn off and separated at 22 as by a filter. Some of the solution containing calcium chloride is recycled at 23, in the particular example this being 90% of the solution. Eight percent of the solution is withdrawn at 24 and treated with slaked lime at 25 to form calcium chloride which is separated as by filtration at 26. The filtrate is divided, and the major portion is carried on for further treatment at 27 and a sufficient amount is rejected at 28 to balance the cycle. The magnesite filter cake produced at 22 is washed at 30 and the washwater is divided, part of it being combined with the filtrate from the slaked lime treatment as shown at 31 and the balance being rejected as shown at 32, as the conditions may require.

The magnesite after washing is briquetted as shown at 33, dried and calcined as shown at 34 at a temperature suitably in excess of 1500° C. in a suitable kiln.

The combined filtrate from the calcium hydroxide treatment and washwater at 35 is treated with solid calcium chloride as shown at 36 in sufficient quantity to compensate for the loss of chlorine ions in the rejected materials and with sufficient sulfuric acid at 37 to convert all or about 1% of the calcium chloride in the solution to hydrochloric acid, thus precipitating calcium sulfate. The calcium sulfate is separated as by filtering at 38. The filtrate at 40 containing hydrochloric acid, water and about 1% of calcium chloride is returned to leach tank 21.

It will thus be evident that in Example VII hydrochloric acid for continued operation is obtained by reacting a solution of calcium chloride with sulfuric acid.

At such times as excess of unprecipitated calcium sulfate becomes a problem, this is eliminated by adding less than the theoretical amount of barium chloride as suggested at 41 to the acid solution to form a precipitate of barium sulfate which is separated as by filtration at 42 and the filtrate is then returned to the hydrochloric acid leach tank 21.

Where reference is made herein to lime it is intended to refer to CaO which will be present in magnesite often in combined form, for example in a complex carbonate.

In the specification and claims, all percentages are by weight.

In view of my invention and disclosure variations and modifications to meet individual whim or particular need will doubtless become evident to others skilled in the art to obtain all or part of the benefits of my invention without copying the process shown, and I therefore claim all such insofar as they fall within the reasonable spirit and scope of my claims.

Having thus described my invention, what I claim as new and desire to secure by Letters Patent is:

1. A process of beneficiating magnesium carbonate containing a minor quantity of calcium carbonate and having a total lime content which is appreciably above 1% counting that of the calcium carbonate, which comprises treating said magnesium carbonate with sulfuric acid in a concentration range between 0.05% and 0.25% by weight in water to preferentially dissolve enough calcium carbonate to lower said lime content to below 1% while leaving magnesium carbonate, and then separating the magnesite residue remaining from the resulting solution.

2. A process of beneficiating magnesium carbonate containing a minor quantity of calcium carbonate and having a total lime content which is appreciably above 1% counting that of the calcium carbonate, which comprises treating said magnesium carbonate with hydrochloric acid in a concentration range between 1 and 10% by weight in water to preferentially dissolve enough calcium carbonate to lower said lime content to below 1% while leaving magnesium carbonate, and then separating the magnesite residue remaining from the resulting solution.

3. A process of claim 2, in which the concentration of hydrochloric acid is about 5% by weight.

4. A process of beneficiating magnesium carbonate containing a minor quantity of calcium carbonate and having a total lime content which is appreciably above 1% counting that of the calcium carbonate, which comprises treating said magnesium carbonate successively in either order with sulfuric acid in a concentration range between 0.05 and 0.25% by weight in water, and with hydrochloric acid in a concentration range between 1 and 10% by weight in water to preferentially dissolve enough calcium carbonate to lower said lime content to below 1% while leaving magnesium carbonate, and then separating the magnesite residue remaining from the resulting solution.

References Cited by the Examiner

UNITED STATES PATENTS

| 539,889 | 5/1895 | D'Andria | 23—201 |
| 968,669 | 8/1910 | Leese | 23—67 |
| 1,489,008 | 4/1924 | Richards | 23—67 |
| 2,058,141 | 10/1936 | Dougherty | 23—201 X |
| 2,359,829 | 10/1944 | Day | 23—201 X |
| 3,116,974 | 1/1964 | Nikolai | 23—201 |

OSCAR R. VERTIZ, *Primary Examiner.*

G. T. OZAKI, *Assistant Examiner.*